United States Patent [19]

Garrick et al.

[11] 4,146,564
[45] Mar. 27, 1979

[54] PROCESS FORMING A MINERAL WOOL FIBERBOARD PRODUCT

[75] Inventors: John R. Garrick; Richard E. Kottmeyer, both of Lancaster, Pa.

[73] Assignee: Armstrong Cork Company, Lancaster, Pa.

[21] Appl. No.: 869,684

[22] Filed: Jan. 16, 1978

Related U.S. Application Data

[62] Division of Ser. No. 780,419, Mar. 23, 1977, Pat. No. 4,097,209.

[51] Int. Cl.² .................................................. B29C 15/00
[52] U.S. Cl. .................................. 264/516; 264/113; 264/121; 264/258; 264/260; 264/518
[58] Field of Search ................ 264/91, 113, 121, 258, 264/260, 89

[56] References Cited

U.S. PATENT DOCUMENTS

| | | | |
|---|---|---|---|
| 2,086,757 | 7/1937 | Williams | 264/113 |
| 2,188,373 | 1/1940 | Pearce | 65/3 |
| 3,276,928 | 10/1966 | Pearson et al. | 425/115 |

Primary Examiner—Robert F. White
Assistant Examiner—James R. Hall

[57] ABSTRACT

A process for forming a mineral wool, resin-bound acoustical insulating fiberboard product is described, which includes steps for mixing mineral wool fibers and powdered thermosetting binder, the introduction of the mixture into an air stream, and the directing of the entrained mixture into a mat-forming zone formed by converging upper and lower forming wires, the exhausting of air through the wires to build up layers of fiber and binder thereon and the consolidation and heating of the layers to form a fiberboard product, the amounts of air exhausted through the forming wires being adjusted so that a resin-enriched layer of predominantly fine fibers is initially deposited on the upper forming wire. A preferred embodiment is disclosed wherein an open mesh glass fabric is positioned between the lower forming wire and the layer of fibers and resins being formed thereover, said fabric acting as a carrier for the board-forming mat.

2 Claims, 2 Drawing Figures

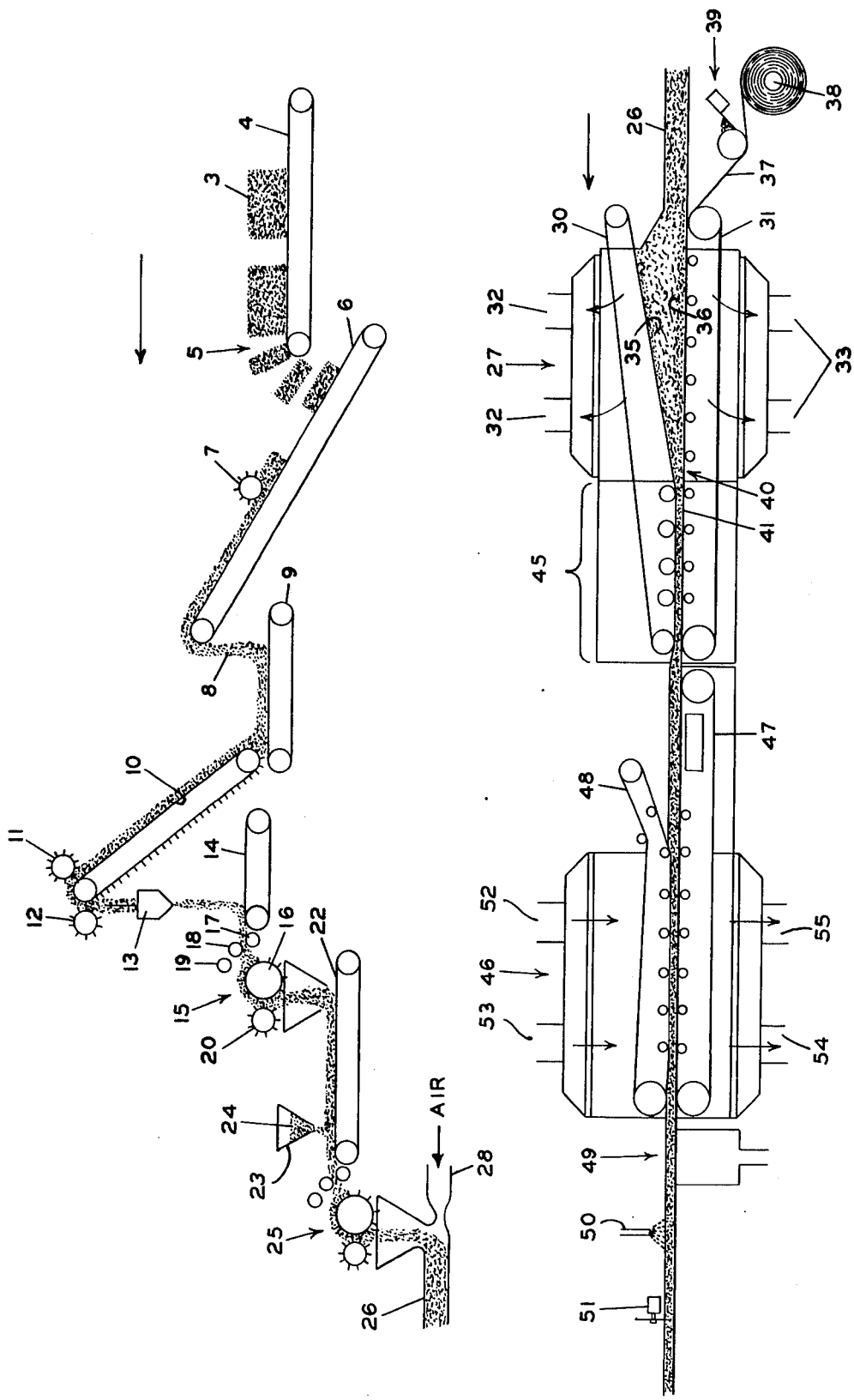

PROCESS FORMING A MINERAL WOOL FIBERBOARD PRODUCT

CROSS-REFERENCE TO RELATED APPLICATION

This is a division, of application Ser. No. 780,419, filed Mar. 23, 1977 now U.S. Pat. No. 4,097,209.

BACKGROUND OF THE INVENTION

1. Field of the Invention

The field of the invention relates to a process for forming a mineral wool fiberboard product from an intimate mixture of mineral wool fibers and thermosetting powdered binder.

2. Description of the Prior Art

Low-density fiberboard products having excellent acoustical properties are readily available. Generally speaking, air laid products are formed from intimate mixtures of glass fibers and thermosetting resinous binders. However, although slurry board forming processes for manufacturing satisfactory low-density good acoustical fiberboard products from shorter mineral wool fibers are known, such shorter fibers present several problems relative to satisfactory mat and board formation using dry laid systems. Typical of the prior art in the field are U.S. Pat. Nos. 2,589,008; 3,356,780; 2,188,373; and 2,012,805.

SUMMARY OF THE INVENTION

The desirability of having an alternate fiber source for forming dry laid acoustical boards having good physical and acoustical properties from mixtures of fibers and resinous binder has led to a consideration of utilizing mineral wool fibers, usually produced as a by-product of steel manufacture from slag, as a replacement for the more common longer glass fibers. It has been noted that the formation of a satisfactory board product from the mineral wood presents difficulties due to short fibers, variability in length, tendency to ball or clump and static buildup in processing. The process of the present invention comprises mixing mineral wool fibers and thermosetting binders, the introduction of the mixture into an air stream, and the direction of the entrained mixture into a mat-forming zone formed by converging upper and lower forming wires, the exhaustion of air through said wires to build up layers of fiber and binder thereon, and the consolidating and heating of the layers to cure the binder and thus bond the associated fibers into a unitary fiberboard product, the amounts of air exhausted through the forming wires being adjusted so that a resin-enriched layer of predominantly fine fibers is initially deposited on the upper forming wire.

BRIEF DESCRIPTION OF THE DRAWING

The FIGURE diagrammatically illustrates the apparatus and process whereby mineral wool fibers are intimately mixed with powdered binder and formed into a fiberboard product.

DESCRIPTION OF THE PREFERRED EMBODIMENT

With reference to the drawing, bales of mineral fibers as received, usually from a steel manufacturer, are broken up and then further subjected to mechanical disintegration operations whereby the individual clumps are further broken down into a mixture of individual fibers. These are then conveyed beneath a feed for a thermosetting powdered binder and fed through further mixing apparatus whereby the fibers and powdered binder are intimately mixed. At this point, the fibers and binder are entrained in an enclosed air stream and then into the board-forming chamber. The board-forming chamber consists of two driven endless forming wires, the upper wire forming the collection means on which one layer of fibers and binder is deposited, and the lower-forming wire forming the second means on which a second layer of fibers and binder is deposited, with the wires being trained to coverge at a nip opening whereby both layers of fibers and binder are consolidated. Vacuum means are positioned above the upper wire and below the lower wire whereby air is withdrawn from the air stream carrying the fibers and binder, thus depositing said fibers and binder as the upper and lower layers which are finally consolidated into the board-forming mat. After exiting from the nip opening formed between the upper and lower belts, the board-forming mat passes to an oven by means of a lower foraminous driven belt and an upper foraminous driven belt, which engages the board-forming mat to compress it while heated air passes therethrough to set the binder material.

After exiting the oven, finishing operations such as painting and cutting the boards to size may be performed.

As a preferred embodiment, an open mesh glass fabric is introduced over the lower-forming wire or belt prior to deposition of fibers and resin from the air stream. Preferably, a liquid binder is applied to the mat prior to introduction into the forming chamber to form a better bond between the mat and the fibers formed thereover. The use of the open mesh glass fiber mat results in two distinct advantages, that is, it acts as a carrier for the board-forming mat throughout the several stages in the process and also acts as a decorative surface integrally bonded to the board during the board formation stage.

In forming a mineral fiberboard product from a mixture of mineral wool fibers and powdered binder, it has been found to be desirable to adjust the air flow through the wires in the forming chamber so as to insure that the layer of fibers and resin initially formed on the respective foraminous belts is both resin enriched and comprised predominantly of the finer fibers. By resin enriched is meant these initially formed layers, which in turn form the outer layers in the final board product, contain more resin than the inner layer of the board. This combination of finer fibers and higher resin composition results in a fiberboard product of enhanced physical properties.

As shown in the drawing, the large arrows show the direction of fabrication. At the outset, bales of mineral wool 3 are placed on a conveyor 4 and separated at 5 from where they are conveyed up an inclined conveyor 6 under a flail 7, which is the point of initial separation of the fibers 8. From the top of conveyor 6 the fibers drop onto conveyor 9 and are fed to an inclined pinned feeder conveyor 10. At the top of conveyor 10 the excess fibers are combed by the rotary comb 11 to level the feed and the feed is doffed by roll 12 into a weigh pan 13 which controls the rate of fiber feed.

The fibers are then dropped from pan 13 onto a feeder conveyor 14 which feeds the fibers into the first of two separting devices 15. Separating device 15 consists of a lickerin 16, feed rolls 17 and 18, clearer roll 19 and brush 20.

From separating device 15, the fibers drop onto a feeder conveyor 22 and pass under a feed 23 for the powdered thermosetting binder 24. The mixture of fibers and binder then passes through the second separating device 25, which is of the same construction as separating device 15. Here the fibers and resin are intimately and homogeneously blended and substantially all the clumps are separated into individual fibers, although some small clumps remain.

From 25 the fiber-binder blend drops into the venturi of an enclosed air distribution and forming system including ducts and fan (not shown) for creating a vacuum in the forming chamber. The enclosed duct 26 leading into the evacuated forming chamber 27 is of plexiglass which effectively minimizes static buildup from the separating and mixing operations. Air infeed is supplied through duct 28 and the fibers and binder are entrained in the air stream created between duct 28 and the evacuated forming chamber 27.

The entrained fibers and resin in the air stream in duct 26 pass into the forming chamber 27. This air stream is created by the vacuum established in the enclosed areas behind the upper driven forming wire 30 and lower driven forming wire 31. Fans (not shown) evacuate the air through ducts 32 at the top of forming chamber 27 and ducts 33 at the bottom of forming chamber 27. Means (not shown) control the velocity of the air stream such that the amounts of resin and fiber as well as fiber types can be classified as the fiber-resin mats 35 and 36 are being built up on forming wires 30 and 31.

An open mesh glass fabric 37, which does not impede air flow, is fed from an unwind stand 38 beneath an adhesive applicator 39 and over lower forming wire 31 at a point just prior to mat buildup. Mats 35 and 36 are consolidated onto the fabric 37 and to each other at the nip opening 40 formed by the converging forming wires 30 and 31, the adhesive on fabric 37 serving to establish a more firm and integral bond between the fabric and consolidated board forming mat 41. Fabric 37 acts as a carrier throughout the balance of the processing steps, which include consolidation in zone 45 and consolidation and cure in oven 46.

A lower driven metal mesh belt 47 and upper driven metal mesh belt 48 convey the fabric and board forming mat into and through oven 46 wherein the thermosetting resin-containing mat is cured under compression to form the acoustical insulating board which is cooled at 49, has paint applied at 50 and is cut to size at cut-off saw 51. Recirculated heated air is supplied to oven 46 through upper ducts 52 and 53 and removed through lower ducts 54 and 55.

EXAMPLE

A typical bale of mineral wool has fibers having fiber diameters of from about 1 to 10 microns, with about 84% having diameters between 2.5 and 6.0 microns. The length distribution is as follows:

0 to 0.25 millimeters — 48%
0.25 to 0.50 millimeters — 34.5%
0.50 to 0.75 millimeters — 10.9%
greater than 0.75 millimeters — balance Mineral fibers in bales, as received from Bethlehem Steel, are separated and weighed, establishing a feed of fibers into separting device 15 of 29.9 pounds per minute (13.6 kilograms per minute). A powdered thermosetting first-step phenol formaldehyde resole resin (Durez 24652) is fed at 23 onto the fibers on conveyor 22 at a rate of 5.3 pounds per minute (2.4 kilograms per minute) and the fiber and resin are intimately mixed in separating device 25 and fed into the enclosed plexiglass duct 26. The line speed established at these rates of feed is about 75 inches per minute (1.9 meter per minute).

The air entering through duct 28 in which the fibers and resin is entrained is at a velocity of about 4000 cubic feet per minute (113.2 cubic meters per minute). At the entrance to the forming chamber 27, the velocity of the air stream is about 11000 cubic feet per minute (311.4 cubic meters per minute). The velocity of the air passing through the upper forming wire 30 is about 4000 cubic feet per minute (113.3 cubic meters per minute) and through the lower forming wire, about 7000 cubic feet per minute (198.2 cubic meters per minute). The air stream passing into the forming chamber 27 and through the forming wires 30 and 31 acts as a classifier, such that the finer fibers initially build up first on the wires with the coarser fibers building up thereover. The two mats of fiber and resin built up on the forming wires are then consolidated into a unitary board forming mat 41 about 52 inches wide at the nip opening 40 formed by the converging forming wires and further consolidated in zone 45.

As discussed hereinbefore, an open mesh glass fabric 37 is drawn off an unwind stand 38, under an adhesive applicator 39 and then over the lower wire screen 31 just prior to fiber-resin buildup. A suitable glass fabric utilized in this example is a J. P. Stevens Style 1635-52"-O-MC weighing 3.95 ounces per square yard. Any open mesh fabric or scrim could be used as long as it didn't interfere with air flow during mat buildup and didn't deteriorate at the oven temperatures. Thus, some plastic cloths could be used as well as glass cloth or scrim. The adhesive utilized is a polyvinyl acetate homopolymer (Vinac AA65), although other liquid adhesives could be used equally as well, for example a liquid urea-melamine formaldehyde resin (Diaron 96-611).

The consolidated board forming mat with the glass cloth facing layer is then carried through the oven 46 by the driven metal mesh belt 47 and is further consolidated during resin cure by the driven metal mesh belt 48. The oven temperature is about 350° F., although heated air at between 300° and 400° F. could be passed through the board to effect cure, the temperature being related to line speed and board thickness.

After exiting from the oven 46, the board is cooled at 49 by passing cooling air therethrough, back painted at 50 and cut to size at 51.

The above process forms a 2-inch (5.1 centimeter) thick board having a glass fabric facing and a density of about 0.65 pounds per board foot (124 kilograms per cubic meter). As measured by Federal Specification PBS-C.2, it has an 18 to 19 N. I. C. (noise isolation class) and a noise reduction coefficient of about 90.

By raising the velocity of the air through the top wire 30 to 8000 cubic feet per minute (226.5 cubic meters per minute) and by lowering the air velocity through the bottom wire 31 to 3000 cubic feet per minute (84.9 cubic meters per minute), most of the finer fibers are deposited solely on the upper wire, resulting in an improvement in N. I. C. to 20 and in noise reduction coefficient to 95.

The forming wires utilized should have openings large enough to allow free air flow, but fine enough to block passage of resin and fibers. A Fourdrinier wire cloth of 24 × 18 mesh (0.7 millimeter × 0.98 millimeter opening) works well. The size openings of the metal mesh belting is less critical since the board forming mat is formed but must also allow for air passage.

Many powdered thermosetting binders may be used including those extended with thermoplastic resins. Typical powdered binders are the one-step phenol formaldehyde resole resins such as Durex 24652 and 24-655 Varcum and the two-step phenol formaldehyde novalac resins such as 29-574 Varcum.

What is claimed is:

1. The process for forming a mineral wool, resin-bond acoustical insulating fiberboard product comprising:
    (a) mixing mineral wool fibers and powdered thermosetting binder,
    (b) introducing the mixture into an air stream and directing the entrained mixture into a mat-forming zone formed by converging upper and lower forming wires,
    (c) exhausting air through said wires to build up layers of fiber and binder thereon, and
    (d) consolidating and heating said layers to cure the binder and thus bond the associated fibers into a unitary fiberboard product,
    the amounts of air exhausted through the forming wires being adjusted so that a resin-enriched layer of predominantly fine fibers is initially deposited on the upper forming wire.

2. The process of claim 1 wherein an open mesh fabric is supplied over the lower forming wire just prior to the fiber-binder layer buildup, said fabric acting as a facing layer in the final product and a carrier for the board-forming mat during the board formation steps.

* * * * *